United States Patent
Miller

[15] 3,687,477
[45] Aug. 29, 1972

[54] VEHICLE SUSPENSION
[72] Inventor: Ronald Earl Miller, Rockford, Ill., 61103
[73] Assignee: Hendrickson Mfg. Co., Lyons, Ill.
[22] Filed: Sept. 28, 1970
[21] Appl. No.: 76,064

[52] U.S. Cl. ........................................280/104.5 A
[51] Int. Cl. .................................................B60g 5/06
[58] Field of Search ..............................280/104.5 A

[56] References Cited
UNITED STATES PATENTS
2,480,211  8/1949  Avila ..................280/104.5 A
2,689,136  9/1954  Hendrickson.......280/104.5 A

*Primary Examiner*—Philip Goodman
*Attorney*—Greist, Lockwood, Greenwalt & Dewey

[57] ABSTRACT

A tandem axle suspension system for road vehicles such as heavy-duty trucks, trailers, and the like, which is characterized by a pair of longitudinally extending load equalizing beams connecting the ends of the axle assemblies on opposite sides of the vehicle and pivotally mounted on saddle assemblies which are resiliently connected in depending relation with side frame members on the vehicle chassis and the equalizing beams each being formed in two sections with telescoping end portions connected by resilient bushings at two spaced points, one of which coincides with and forms the pivotal connection with the respective saddle assembly.

4 Claims, 5 Drawing Figures

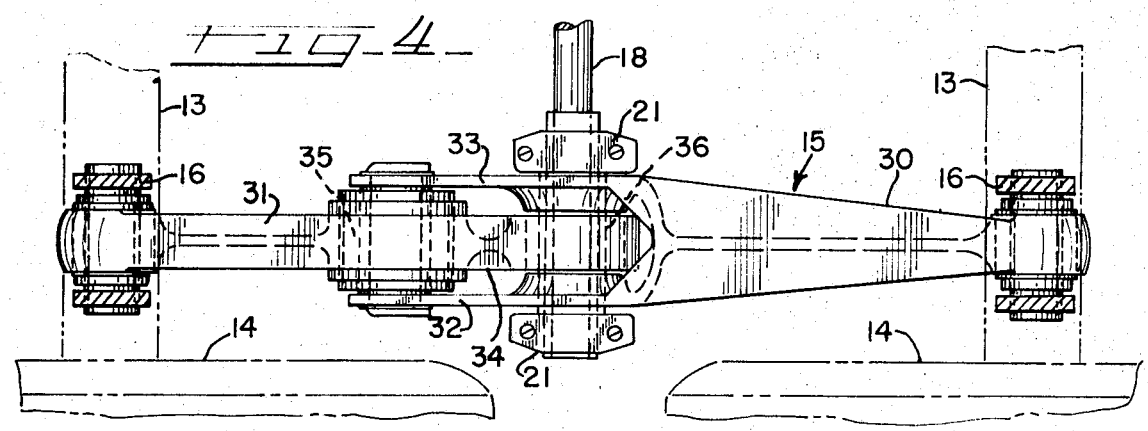
Fig-4-
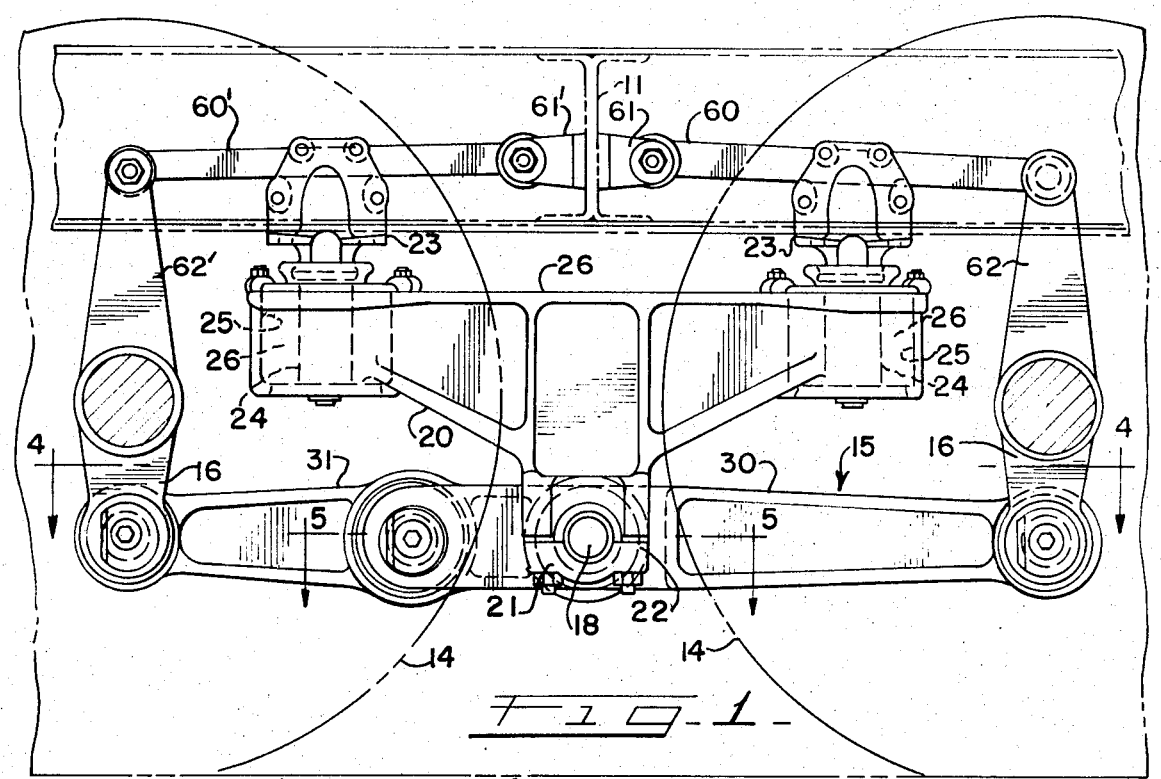
Fig-1-
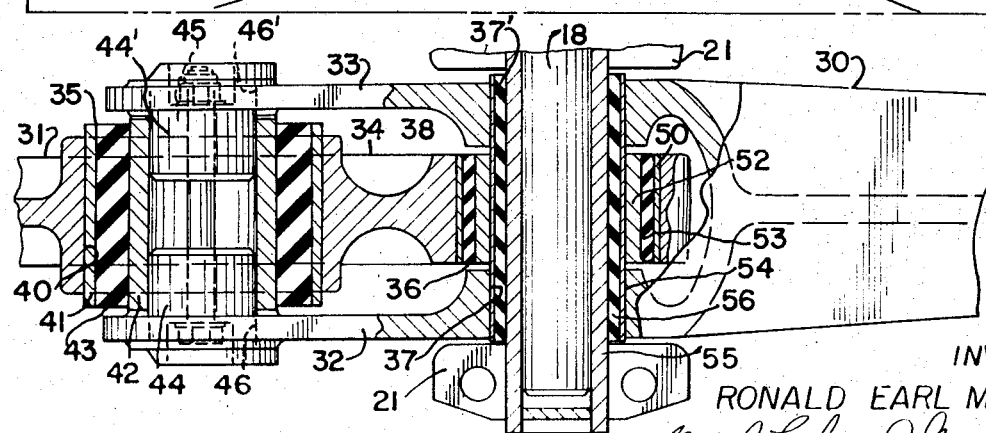
Fig-5-
INVENTOR
RONALD EARL MILLER
BY
ATT'YS.

INVENTOR
RONALD EARL MILLER
ATT'YS.

VEHICLE SUSPENSION

This invention relates to suspension systems for vehicles such as trucks, trailers, or the like, and is more particularly concerned with improvements and innovations in a tandem axle suspension system which employs a pair of equalizing beam assemblies for interconnecting the ends of the axle assemblies on opposite sides of the suspension.

Tandem axle suspensions of the general type with which the present invention is concerned are shown, for example, in my U.S. Pat. No. 2,980,439 and R.T. Hendrickson U.S. Pats. Nos. 2,940,771 and 2,689,136. Suspensions of this type, which are in wide commercial use on heavy-duty trucks, semi-trailers, and like vehicles, generally comprise fore and aft axle assemblies with dual ground wheels mounted on the outer ends thereof, a pair of equalizer beam assemblies interconnecting the ends of the axle assemblies on opposite sides of the suspension, saddle assemblies pivotally mounted on the equalizer beams midway between the opposite ends thereof, resilient connections suspending the saddle assemblies from the frame members, and a stabilizing center cross tube interconnecting the saddle assemblies. In these prior constructions the equalizer beams, frequently referred to as "Walking Beams", have generally been of relatively heavy, one piece rigid construction which results in the transmission of stress directly from one axle to the other when a wheel assembly drops into a hole or passes over an obstruction in the road or other surface over which the vehicle is traveling. In this type of suspension rigidity in the equalizing beams has been considered necessary in order to provide for the desired equalization or distribution of the load to the two axles. More recently it has been found that a one piece rigid equalizer beam is not necessary to obtain equal distribution of the load on the two axles and that there are advantages in a sectional equalizer beam construction which is not at all times rigid. One such beam construction is shown in my copending application Ser. No. 741,641 filed July 1, 1968. An object of the present invention is to provide an improvement in the construction of equalizing beams for vehicle suspensions so as to enable beams to function at least to some degree as stress absorbing members without detracting from the principal function of equalizing the load on the axles.

A more specific object of the invention is the provision in a tandem axle suspension of the type described wherein a load equalizing beam is connected at opposite ends to the axle assemblies and pivoted intermediate its ends to a saddle assembly, which equalizing beam is constructed of multiple section construction with the sections connected so as to enable the beam to absorb some of the stress which in previous one piece constructions is transferred from one axle directly to the other.

A still more specific object of the invention is to provide a tandem axle suspension wherein an equalizing beam is employed which is connected at its opposite ends to the corresponding ends of the axle assemblies and pivoted intermediate its ends to a saddle assembly suspended from the vehicle chassis, which equalizing beam is fabricated in two parts with telescoping end sections intermediate the axle connected ends which end sections are connected to each other at spaced points by resilient bushings with one point coinciding with the pivotal connection with the saddle assembly.

These and other objects and advantages of the invention will be apparent from a consideration of the suspension system shown by way of illustration in the accompanying drawings wherein:

FIG. 1 is a side elevational view of the rear portion of a vehicle chassis frame having a rear axle suspension constituting an embodiment of the present invention;

FIG. 4 is a view taken on the line 4—4 of FIG. 1; and

FIG. 5 is a sectional view taken on the line 5—5 of FIG. 1 with portions broken away.

Figure 2:
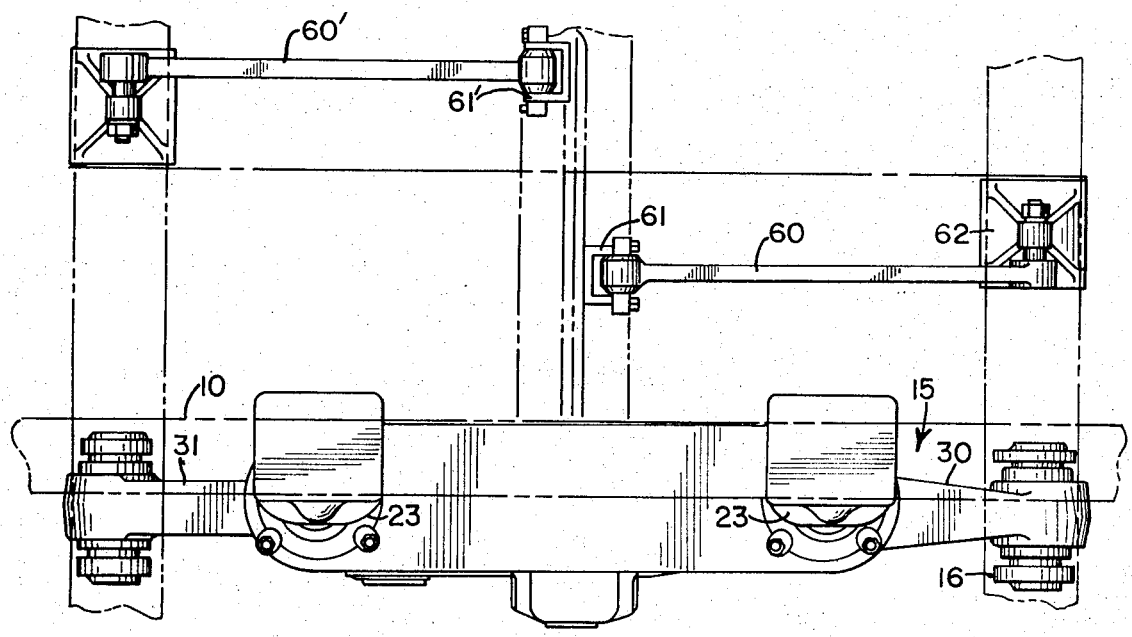
FIG. 2 is a fragmentary top plan view with portions omitted or in phantom line, the view showing one side of the embodiment of the suspension which is shown in FIG. 1.
Figure 3:
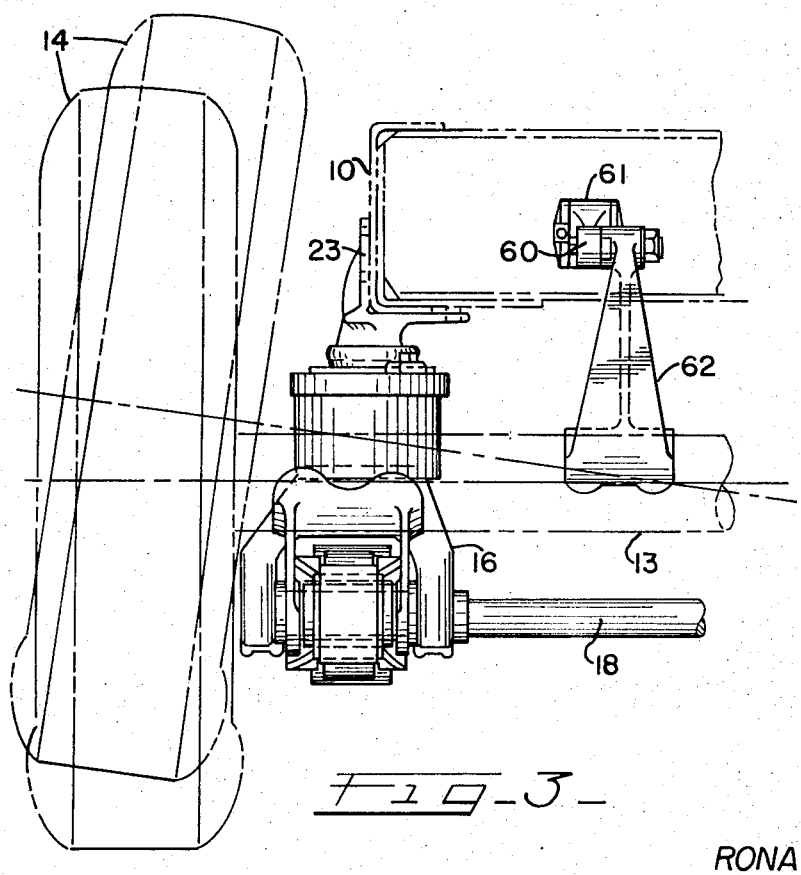
FIG. 3 is a partial rear end elevation of the suspension shown in FIG. 1.

Referring to FIGS. 1 to 3 of the drawings, the chassis or supporting frame of the vehicle may typically include a pair of longitudinal channel beams 10 with a connecting cross beam 11, beneath which is located a tandem rear axle unit 12 which supports the rear end of the vehicle. The construction on one side of the vehicle is identical with that on the other side except that one is right handed and the other is left handed. Therefore, it will suffice to describe and show only one side of the tandem wheel support, it being understood that the other side corresponds.

A pair of tandem axle housings are indicated at 13, 13 which extend transversely underneath the chassis frame and which have ground engaging wheels 14, 14 mounted on opposite ends thereof. The wheels 14, 14 may be of the dual type. Interiorly of each of the sets of wheels 14, 14 an equalizing beam assembly 14, generally referred to as a walking beam, is provided which extends between the adjacent ends of the axle housings 13, 13 and is pivotally supported or connected thereto by means of brackets or hangers 16, 16. The lower ends of the brackets 16, 16 are bifurcated so as to fit over eyes 17 formed on the opposite ends of each walking beam 15.

The walking beams 15 are pivotally connected intermediate their ends to saddles 20 depending from the frame side beams 10 and a cross shaft 18 has a connection at each end with a saddle 20. The saddle 20 is provided with a removable bottom bearing part 21 which mates with an upper bearing part 22 integrally formed as part of the saddle 20. The mating and bearing parts 21 and 22 provide journal bearings by which the saddles are pivotally connected to the walking beam assemblies 15 with the end of the cross shaft 18 passing through the center bushing of each of the walking beam assemblies 15 and extending across the unit and transversely of the chassis frame so that one shaft 18 serves both walking beams 15.

Each saddle member 20 is suspended from a side frame member 10 by a pair of bracket forming members 23. The bracket members 23 each have a depending pin formation 24 which extends into a socket forming bore 25 extending vertically at opposite ends of an elongate, flat, top surface 26 on the saddle member 20. The pin 24 is secured in the socket 25 with a resilient busing assembly 26 interposed between the pin 24 and the wall of the bore 25. This resilient bushing may be, for example, of the construction shown in my U.S. Pat. No. 2,980,439 and in my copending application Ser. No. 741,641, now U.S. Pat. No. 3,545,787. Other connections, preferably of a resilient nature, may be employed to connect the saddle 20 in suspended relation with the chassis frame.

The equalizing beams or walking beam assemblies 15 are of special construction. Each of the beams 15 comprises two beam sections 30 and 31. The one section 30 which is on the right as viewed in FIG. 1, has its inner end bifurcated to provide two plate-like legs 32 and 33 which are disposed in parallel vertical planes and spaced apart a sufficient distance to accommodate the inner end portion 34 of the other beam section 31. The two beam sections 30 and 31 are connected in axially aligned relation at two spaced points by resilient bushing assemblies 35 and 36. The one bushing assembly 36 is seated in section connecting transversely aligned pivot holes 37, 37' in the parallel legs 32, 33 of beam section 30 and hole 38 in the end 34 of the beam section 31 and constitutes the center pivot bushing for receiving the cross shaft 18 and connecting the beam to the saddle 20. The cross shaft 18 has a sliding fit into the beam bushing 36 to keep the opposite hand saddles in alignment.

The resilient bushing assembly 35 comprises an outer metallic sleeve 41 seated in the bore 40 of the beam section 31 and an inner sleeve 42 between which there is interposed a cylindrical sleeve of rubber or similar resilient material 43. The assembly 35 is positioned in the hole 40 in the beam section with the ends of the inner sleeve 42 fitting between and against the inner faces of the parallel legs 32 and 33 and held in position by a pair of plug members 44, 44' clamped by the bolt 45 with the plug members having portions extending through the holes 46, 46' in the legs 32, 33 of the beam section 30 and into the ends of the inner sleeve 42. The sleeve 43 is grooved or recessed on its surfaces to receive the inner and outer metallic sleeves 41, 42 and prevent relative axial movement.

The bushing assembly 36 which functions to connect the two beam sections 30, 31 and also to pivotally connect the beam to the saddle 20 comprises an outer metallic sleeve 50 seated in the bore 38 in the end of the beam section 31 and an inner metallic sleeve 52 between which there is interposed a cylindrical sleeve of rubber or similar resilient material 53. The inner metallic sleeve 53 is received on a metallic sleeve 54 which is of greater axial dimension than the sleeve 52 and which is seated in the pivot holes 37, 37' in the legs 32, 33 of the beam section 30. The inner sleeve 54 encompasses the metallic pivot sleeve 55 and an interposed cylindrical sleeve 56 of rubber or similar resilient material, the assembly forming the pivot bushing for receiving the end of the cross shaft 18.

The beam 15 is preferably connected at its ends to the depending hangers 16 on the axle assemblies by resilient bushing assemblies of the same character as the bushing assemblies 35 and 36 which are employed for connecting the two sections 30 and 31 of the beam 15. These connections allow some relative movement between the members and permit the two sections 30 and 31 of the equalizing beam to function at least in part as a stress absorbing member so that when one of the wheel assemblies 14 drops into a hole or strikes a bump in the surface over which the vehicle is traveling at least part of the stress is absorbed by the connecting sleeve assemblies 35, 36 between the two sections 30, 31 of the walking beam 15. The two part construction of the beam 15 with the resilient connections does not materially affect the functioning of the beam in the equalization of the load between the fore and aft axle assemblies which is transmitted through the pivotal connection with the saddle 20.

While specific resilient bushings are shown in the form of the invention which is illustrated, it is contemplated that other connections of an equivalent nature may be employed. Also, the saddle and associated elements for mounting the equalizing beams on the chassis frame may take some other form than that which is illustrated.

To complete the suspension assembly when the axles are driven so as to be subject to a rotational force, torque rods 60 and 60' may be employed which are pivotally connected at one end to brackets 61 and 61' secured on the cross beam 11 and at the other end to the free ends of bracket members 62 and 62'. The torque rods may be of the character shown in my Pat. No. 2,983,555 or any equivalent form so as to stabilize the axle assemblies and prevent undesired rotation thereof.

While particular materials and specific details of construction are referred to in describing the illustrated form of the invention, it will be understood that other materials and equivalent structural details may be resorted to within the spirit of the invention.

I claim:

1. An axle suspension for vehicles which is disposed beneath the vehicle chassis frame, said suspension comprising a pair of parallel fore and aft axle assemblies with ground wheels on opposite ends thereof, a pair of equalizer beam assemblies interconnecting the ends of said axle assemblies on opposite sides of said suspension, saddle assemblies pivotally connected to the equalizer beam assemblies midway between the ends thereof, means connecting the saddle assemblies in suspended relation from the vehicle chassis frame at opposite sides thereof, and said equalizer beam assemblies each being formed of interconnected beam sections which are normally substantially rigid and which operate as a unit for equalizing the load on the axle assemblies, said beam sections being connected at their outer ends to said axle assemblies and at their inner ends to each other by resilient pivot members spaced lengthwise of said beam assembly which are adapted to absorb at least a part of the stress which would otherwise be transferred between the axle assemblies when there is a change in the reaction to the axle load due to unevenness in the surface engaged by the ground wheels, one of said beam sections having its inner end terminating at the pivotal connection of said beam and the associated saddle assembly and the other beam section having its inner end extending beyond the pivot connection with the saddle assembly an terminating at a pivot member connecting said beam sections which is spaced from the pivotal connection of said beam and the associated saddle assembly.

2. An axle suspension for vehicles which is disposed beneath the vehicle chassis frame, said suspension comprising a pair of parallel fore and aft axle assemblies with ground wheels on opposite ends thereof, a pair of equalizer beam assemblies interconnecting the ends of said axle assemblies on opposite sides of said suspension, saddle assemblies pivotally connected to the equalizer beams midway between the ends thereof, means connecting the saddle assemblies in suspended relation from the vehicle chassis frame at opposite sides thereof, and said equalizer beam assemblies each being formed of interconnected beam sections which are normally substantially rigid and which operate as a unit for equalizing the load on the axle assemblies, and said beam sections being connected to each other by resilient pivot members spaced lengthwise of said beam assembly which are adapted to absorb at least a part of the stress which would otherwise be transferred between the axle assemblies when there is a change in the reaction to the axle load due to unevenness in the surface engaged by the ground wheels and one of said beam sections terminating at the pivotal connection of said beam and the associated saddle assembly and said equalizer beam assemblies each comprising two beam sections having inner end portions in telescoping relation and resiliently connected at axially spaced points one of which coincides with the connection of said equalizer beam assembly with the saddle assembly.

3. An axle suspension for vehicles which is disposed beneath the vehicle chassis frame, said suspension comprising a pair of parallel fore and aft axle assemblies with ground wheels on opposite ends thereof, a pair of equalizer beam assemblies interconnecting the ends of said axle assemblies on opposite sides of said suspension, saddle assemblies pivotally connected to the equalizer beams midway between the ends thereof, means connecting the saddle assemblies in suspended relation from the vehicle chassis frame at opposite sides thereof, and said equalizer beam assemblies each being formed of interconnected beam sections which are normally substantially rigid and which operate as a unit for equalizing the load on the axle assemblies, and said beam sections being connected to each other by resilient pivot members spaced lengthwise of said beam assembly which are adapted to absorb at least a part of the stress which would otherwise be transferred between the axle assemblies when there is a change in the reaction to the axle load due to unevenness in the surface engaged by the ground wheels and one of said beam sections terminating at the pivotal connection of said beam and the associated saddle assembly and said equalizer beam assemblies each comprising end sections having inner portions in telescoping relation with transversely extending resilient sleeve connections spaced in the direction of the longitudinal axis thereof, one of said connections coinciding with the connection of said equalizer beam with the saddle assembly and the other spaced therefrom so as to permit limited relative movement of said end sections and to absorb stresses when an uneven supporting surface results in unequal reaction to the load on the axle assemblies.

4. An axle suspension for road vehicles which is disposed beneath the vehicle chassis frame, said suspension comprising a pair of parallel fore and aft axle assemblies with ground wheels on opposite ends thereof, a pair of equalizer beam assemblies each having outer end portions connected by brackets to the ends of said axle assemblies on opposite sides of said suspension, saddle assemblies pivotally connected to the equalizer beams midway between the ends thereof, resilient connections between the saddle assemblies and the vehicle chassis frame at opposite sides thereof, and said equalizer beam assemblies each being formed of two interconnected beam sections which are normally substantially rigid and which operate as a unit for equalizing the load on the axle assemblies, said two equalizer beam sections having inner end portions which are interleaved, resilient connections between the interleaved end portions of said equalizer beam sections which are spaced lengthwise of said beam sections and which will permit limited relative movement of said end portions so as to absorb stresses when there is an unequal reaction to the load on the axle assemblies, and one of said resilient connections between said beam sections coinciding with the pivotal connection between said equalizer beam and the associated saddle assembly.

* * * * *